Jan. 27, 1970  DAVID C. CHANG  3,492,502
BI-DIRECTIONAL CAPACITIVE LOAD DRIVER
Filed July 14, 1967
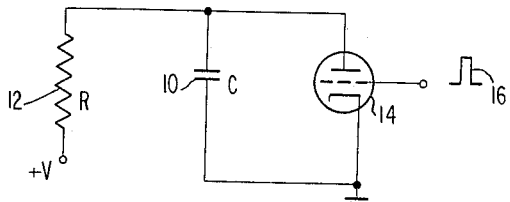
FIG.1 PRIOR ART
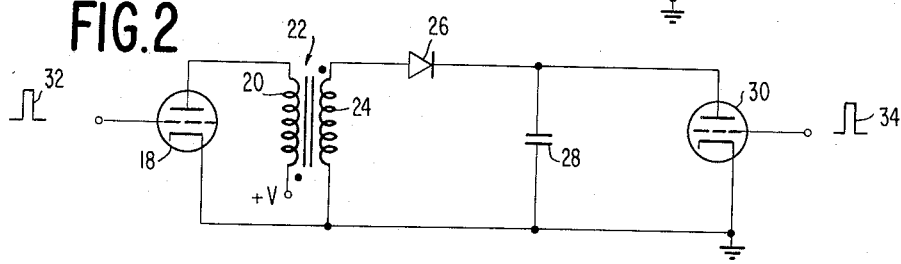
FIG.2
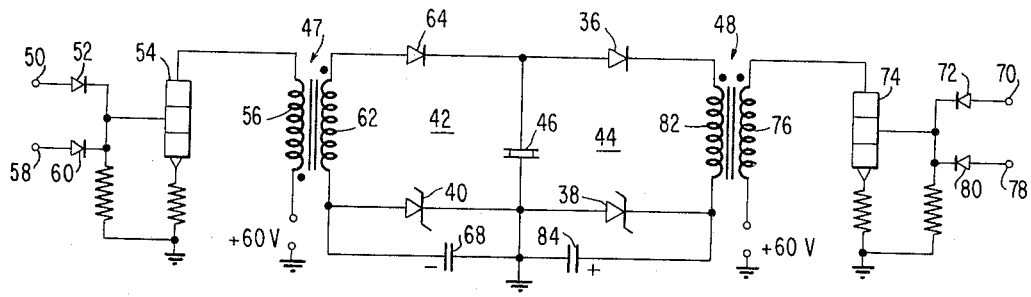
FIG.3
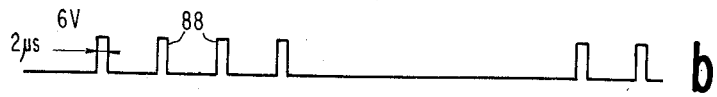
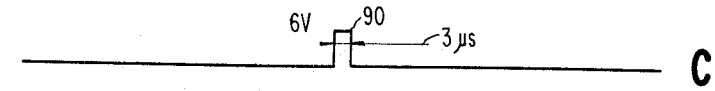
FIG.4
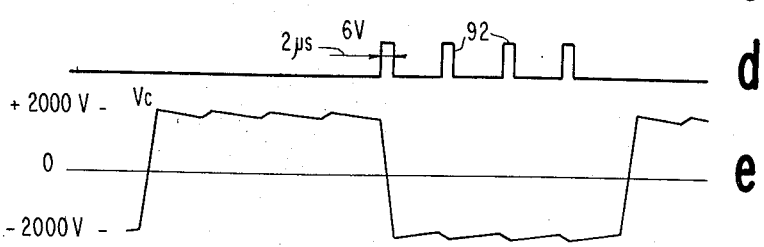
INVENTOR
DAVID C. CHANG
BY Sughrue, Rothwell, Mion, Zinn & Macpeak
ATTORNEYS

United States Patent Office 3,492,502
Patented Jan. 27, 1970

3,492,502
BI-DIRECTIONAL CAPACITIVE LOAD DRIVER
David C. Chang, Poughkeepsie, N.Y., assignor to International Business Machines Corporation, Armonk, N.Y., a corporation of New York
Filed July 14, 1967, Ser. No. 653,571
Int. Cl. H03k 17/02
U.S. Cl. 307—246        7 Claims

ABSTRACT OF THE DISCLOSURE

A solid state circuit for accomplishing high voltage switching of a capacitive load without the use of high voltage power supplies or high voltage tubes. The capacitive load is connected in parallel with a positive charging loop and a negative charging loop. Each loop consists of the secondary of a pulse transformer, a blocking diode, a capacitive load and a reference voltage device such as a series of Zener diodes whose combined Zener voltage is equal to the magnitude of the maximum voltage of either polarity to be switched across the load. The primaries of the transformers are connected through transistor switches to a common DC voltage supply. When a positive charge is to be placed upon the capacitor, the switch associated with the positive charging loop is closed to produce a current pulse in the secondary of the positive charging loop. The reference voltage device in the negative charging loop back-biases the blocking diode in the negative charging loop to prevent the capacitive load from discharging from the negative charging loop when the switch is open. Similarly, the switch associated with the negative charging loop is closed to produce a current pulse of proper polarity in the negative charging loop to charge the capacitive load negatively. The amplitude and duration of the pulses induced in the charging loops may be controlled by controlling duration and amplitude of the current switch through the primary of each transformer, thereby controlling the voltage across the capacitive load. The transformers are step-up transformers so that a 60 volt DC power supply can switch a swing of approximately 4000 volts across the capacitive load.

BACKGROUND OF THE INVENTION

Field of the invention

The invention relates to a solid state low voltage circuit for switching high voltages across a capacitive load.

Description of the prior art

In driving a capacitive load, such as a KDP crystal, a circuit is required to switch approximately 4000 volts across a 50–100 pf. load. The simplest approach is to charge the crystal through a resistor and discharge it through a high voltage tube. However, such an approach is highly impractical since the small resistance required to achieve fast rise time causes prohibitive power dissipation when switching high voltages. In order to minimize such dissipation, there should be a maximum impedance across the capacitive load at either charged state so that power dissipation only occurs during changes of voltage across the load.

The general solution suggested by the problem is to charge with voltage sources through switches or else to charge with current sources. For voltages of the order of 4000 volts, only vacuum tubes are usable. However, tubes are capable of conducting current in only one direction and thus, positive charging must be driven by the tube cathode, thereby requiring the tube filament to be floated at high voltages.

SUMMARY

The floating filament problem is solved in this invention by using a transformer to invert the current direction and including a blocking diode to minimize the loss of charge when the charging current is removed. Furthermore, the high voltage discharging tube is replaced with a negative voltage rectifier, and reference voltage devices, such as Zener diodes, are added in both the charging and discharging paths of the capacitive load, thereby permitting the load to be charged both above and below ground potential.

BRIEF DESCRIPTION OF THE DRAWINGS

FIGURE 1 is a schematic diagram of a prior art driver circuit;
FIGURE 2 is a schematic diagram of a modification of FIGURE 1;
FIGURE 3 is a schematic diagram of a preferred embodiment of the improved driver circuit of the invention; and
FIGURE 4 illustrates current and voltage waveforms at various points of the circuit of FIGURE 3.

DESCRIPTION OF THE PREFERRED EMBODIMENT

First, let us look at a basic prior art capacitive load driver which requires a high voltage vacuum tube for discharging. In FIGURE 1, a capacitive load 10 is charged positively relative to ground from a positive voltage source +V through a resistor 12. A discharging vacuum tube 14 is connected between the positive side of load 10 and ground. A positive pulse 16 is applied to the grid of the tube 14 to render it conducting to discharge the capacitor to ground. In order to apply 4000 volts across the capacitive load 10, the voltage source +V must be capable of producing at least 4000 volts. Resistor 12 must be relatively low to achieve fast rise time in charging the capacitor with a resultant high power dissipation. Furthermore, tube 14 must be a high voltage vacuum tube capable of handling the 4000 volts across the capacitive load 10. If resistor 12 were replaced with a vacuum tube, since vacuum tubes are capable of conducting current in only one direction, positive charging must be driven by the cathode thereby requiring the tube filaments to be floated at a high voltage.

FIGURE 2 illustrates a capacitive load driver circuit in which the floating filament problem is eliminated but the high voltage vacuum tube is still required. Here, a low voltage vacuum tube 18, functioning as an electronic switch, is connected in series with the primary winding 20 of a transformer 22. The secondary winding 24 is connected through a blocking diode 26 to the capacitive load 28. A high voltage vacuum tube 30 is connected across the capacitive load 28. In this circuit, when a positive pulse 32 is applied to the grid of tube 18, the tube becomes conducting and a pulse is produced in the primary winding 20 and transferred to the secondary winding 24. Transformer 22 is a step-up pulse transformer with a turns ratio of approximately 1:80. Let us assume that 4000 volts are produced across the secondary winding 24 so that charging current flows through the diode 26 and through capacitive load 28 to eventually apply 4000 volts across load 28. To switch the load voltage to ground a positive pulse 34 is applied to the grid of discharge tube 30 so that the load 28 discharges through tube 30 to ground. Even though this circuit eliminates the problem of floating the filament of tube 30 at a high voltage above ground, tube 30 must still be a high voltage vacuum tube.

In the improved bidirectional capacitive load driver of FIGURE 3, a high voltage vacuum tube is not required. In essence, in the improved circuit, another blocking diode 36 replaces the discharge tube 30 of FIGURE 2 and Zener diode devices 38 and 40 are added to act as reference voltage devices.

Looking at FIGURE 3 in more detail, the circuit consists of a positive charging loop 42 and a negative charging loop 44 each connected across a capacitive load 46. The load 46 may be a KDP crystal which is utilized to rotate the polarization direction of linearly polarized light and has a capacitance of approximately 50–100 pf. Except for the direction in which the secondary windings of the transformers 47 and 48 are wound, the circuit is completely symmetrical.

On the positive charging side of the circuit, a transition input terminal 50 is connected through a diode 52 to the base of an NPN switching transistor 54 which is connected in series with the primary winding 56 of transformer 47 and a voltage source of +60 volts DC. A level sustaining input terminal 58 is connected through another diode 60 to the base of transistor 54. The secondary winding 62 of transformer 47 is connected in series with a semiconductor blocking diode 64, the capacitive load 46 and a Zener diode 40. Zener diode 40 in actual practice may be a plurality of Zener diodes connected in series so that the total Zener voltage is 2000 volts. Connected in parallel with Zener diode 40 is a filter capacitor 68 which has a value of approximately 20 to 100 times the capacitance of the load 46.

Similarly, on the negative side of the circuit, a transition input terminal 70 is connected through a semiconductor diode 72 to the base of another NPN switching transistor 74 which is connected in series with the primary winding 76 of transformer 48 and a voltage supply of +60 volts DC. This voltage supply may be the same as the voltage supply connected to the primary winding 56. A negative level sustaining input terminal 78 is connected through a diode 80 to the base of transistor 74. The secondary winding 82 of transformer 48 is connected in series with the blocking diode 36, the capacitive load 46 and Zener diode 38. Zener diode 38 is identical to the Zener diode 40. Another filter capacitor 84 identical to filter capacitor 68 is connected in parallel with Zener diode 38.

The operation of the circuit in FIGURE 3 will be described with reference to the waveforms illustrated in FIGURE 4. To apply the +2000 volts across capacitive load 46, a switching pulse 86 is applied to the transition input terminal 50. Pulse 86 is approximately six volts in amplitude and approximately three microseconds long. The pulse turns on the transistor switch 54 so that current flows from the +60 volt source through primary winding 56 and transistor 54 to ground. A 4000 volt pulse is induced in secondary winding 62 to produce a capacitive charging current which ultimately charges capacitive load 46 to +2000 volts and develops 2000 volts acorss Zener diode 40. Of course, Zener diode 40 maintains a drop of 2000 volts regardless of the current passing through it.

The blocking diode 64 blocks the discharge of the positive current of capacitive load 46 through the positive charging loop 42. Furthermore, the Zener voltage across the Zener diode 38 back-biases the blocking diode 36 with 2000 volts thereby blocking discharge of the capacitive load 46 through the negative charging loop 44. However, even though both of the charging loops are effectively blocked, there is some leakage of charge from the capacitive load 46. To maintain the maximum voltage of 2000 volts on the capacitive load 46, sustaining pulses 88 are applied to the level sustaining input terminal 58. As shown in line b of FIGURE 4, these sustaining pulses have an amplitude of six volts and a duration of approximately two microseconds. Line e of FIGURE 4 shows the slight sawtooth superimposed upon the load voltage Vc caused by the capacitor leakage and recharging by the sustaining pulses 88.

The negative charging loop 44 operates in the same manner as the positive charging loop 42. A transition pulse 90 applied to terminal 70 turns on transistor 74 to complete a current path through primary winding 76 to the +60 volt power supply. An approximately 4000 volt pulse is then induced in the secondary winding 82 which is wound in such direction that its upper end is negative with respect to ground potential at the same time that the upper end of the primary winding is negative. The resultant current in the negative charging loop 44 charges the capacitive load 46 to −2000 volts and develops a voltage of −2000 volts across the Zener diode 40. Diode 36 blocks the discharge of the capacitive load 46 through the negative charging loop 44, and the diode 64, back-biased by the Zener voltage across diode 40, blocks discharge of the capacitive load through the positive charging loop 42. Sustaining pulses 92 shown on line d of FIGURE 4 are applied to terminal 78 to replace the charge lost through leakage so that −2000 volts is maintained across the capacitive load 46.

The amplitude of the superimposed sawtooth wave in line e of FIGURE 4 can be made negligible by increasing the frequency of the sustaining pulses 90 and 92. An actual circuit was operated with Vc varying from DC to 30 kc. using 10 kc. sustaining pulses.

While the invention has been particularly shown and described with reference to a preferred embodiment thereof, it will be understood by those skilled in the art that various changes in form and details may be made therein without departing from the spirit and scope of the invention.

What is claimed is:
1. A circuit for driving a capacitive load from a voltage source of a predetermined polarity comprising:
 (a) a positive charging circuit,
 (b) means for connecting said positive charging circuit across a capacitive load,
 (c) a negative charging circuit,
 (d) means for connecting said negative charging circuit across said load,
 (e) said positive charging circuit comprising a first rectifier and a first constant voltage device connected in series,
 (f) said negative charging circuit comprising a second rectifier and a second constant voltage device connected in series, and
 (g) means for selectively coupling said positive and negative charging circuits to a voltage source of predetermined polarity to apply positive and negative output voltages to said load.

2. A circuit as defined in claim 1 wherein said coupling means further comprises:
 (a) a first transformer having a primary and a secondary winding,
  (1) means connecting said secondary winding in series with said positive charging circuit, and
  (2) means for connecting said primary winding to said voltage source, and
 (b) a second transformer having a primary and a secondary winding,
  (1) means connecting said secondary winding in series with said negative charging circuit, and
  (2) means for connecting said primary winding to said voltage source.

3. A circuit as defined in claim 2 wherein said means for connecting said primary windings to said voltage source comprise transistor switches.

4. A circuit as defined in claim 2 wherein
 (a) said first constant voltage device comprises first Zener diode means poled opposite to said first rectifier, and
 (b) said second constant voltage device comprises second Zener diode means poled opposite to said second rectifier, whereby the constant Zener voltage developed across each of said Zener diode means when charging current flows in said charging circuits back-biases the corresponding one of said first and second rectifiers.

5. A circuit as defined in claim 4 further comprising a filter capacitor connected across each of said Zener diode means.

6. A circuit as defined in claim 4 wherein the magnitude of the Zener voltage of each of said first and second Zener diode means is equal to approximately one half of the magnitude of the voltage developed across each of said secondary windings when the corresponding primary winding is connected to said voltage source.

7. A circuit as defined in claim 3 further comprising means for controlling the switching times of said transistor switches, thereby controlling the magnitude of said output voltages.

References Cited

UNITED STATES PATENTS

| | | | |
|---|---|---|---|
| 3,078,395 | 2/1963 | Fraipont | 307—270 |
| 3,087,047 | 4/1963 | Rockafellow | 320—1 X |

JOHN S. HEYMAN, Primary Examiner

STANLEY D. MILLER, Assistant Examiner

U.S. Cl. X.R.

307—259, 262, 317, 318; 320—1